United States Patent
Li et al.

(10) Patent No.: US 8,823,695 B2
(45) Date of Patent: Sep. 2, 2014

(54) 3D DISPLAY, BARRIER DEVICE AND DRIVING METHOD THEREFOR

(75) Inventors: Ra Bin Li, Tainan (TW); Heng Cheng Tseng, Chiayi County (TW); Mu Kai Kang, Pingtung County (TW); Feng Weei Kuo, Pingtung County (TW)

(73) Assignee: Hannstar Display Corp., New Taipei (TW)

( * ) Notice: Subject to any disclaimer, the term of this patent is extended or adjusted under 35 U.S.C. 154(b) by 258 days.

(21) Appl. No.: 13/313,110

(22) Filed: Dec. 7, 2011

(65) Prior Publication Data
US 2012/0188230 A1    Jul. 26, 2012

(30) Foreign Application Priority Data

Jan. 25, 2011 (TW) .............................. 100102694 A
Feb. 9, 2011 (CN) ........................... 2011 1 0035158

(51) Int. Cl.
*G09G 5/00* (2006.01)
(52) U.S. Cl.
USPC .......................................... 345/212; 349/33
(58) Field of Classification Search
None
See application file for complete search history.

(56) References Cited

U.S. PATENT DOCUMENTS

| 8,368,685 | B2* | 2/2013 | Arai | 345/214 |
|---|---|---|---|---|
| 8,427,626 | B2* | 4/2013 | Takahashi et al. | 349/200 |
| 2010/0039573 | A1* | 2/2010 | Park et al. | 349/15 |
| 2011/0170026 | A1* | 7/2011 | Lin | 349/15 |
| 2011/0304530 | A1* | 12/2011 | Yeh et al. | 345/156 |

FOREIGN PATENT DOCUMENTS

| CN | 1764288 A | 4/2006 |
|---|---|---|
| KR | 101113066 B1 | 12/2006 |

* cited by examiner

*Primary Examiner* — Jason Olson
(74) *Attorney, Agent, or Firm* — Lowe Hauptman & Ham, LLP

(57) ABSTRACT

The present invention provides a barrier device including an upper substrate, a lower substrate and a liquid crystal layer sandwiched between the upper substrate and the lower substrate. The upper substrate includes a first substrate and a first electrode, a first insulation layer and a plurality of first stripe electrodes sequentially formed on the first substrate. The lower substrate includes a second substrate and a second electrode, a second insulation layer and a plurality of second stripe electrodes sequentially formed on the second substrate. The present invention further provides a 3D display and a driving method for a barrier device.

12 Claims, 4 Drawing Sheets

3D DISPLAY, BARRIER DEVICE AND DRIVING METHOD THEREFOR

CROSS REFERENCE TO RELATED APPLICATION

This application claims the priority benefit of Taiwan Patent Application Serial Number 100102694, filed on Jan. 25, 2011, the full disclosure of which is incorporated herein by reference.

BACKGROUND

1. Field of the Invention

This invention generally relates to a display device and, more particularly, to a barrier 3D display and a driving method for a barrier device.

2. Description of the Related Art

Along with the maturity of the liquid crystal display (LCD) technology, various portable electronic devices generally adopt a liquid crystal display to increase the practicability thereof. In order to further increase the operational convenience of the portable electronic device, the liquid crystal device adopted in the portable electronic device can display in two directions; in other words, even the portable electronic device is rotated between portrait and landscape views, the operation direction of the liquid crystal display is also rotated simultaneously to allow the user to see images normally. Meanwhile, as the 3D display is gradually becoming popular, in addition to the household display having 3D display function, the portable electronic device such as the cell phone, PDA and notebook may adopt a 3D display to increase the pleasure of electronic products.

A conventional 3D display generates left-eye image signals and right-eye image signals having perpendicular polarization directions within different time intervals such that a user can see 3D images only by using polarization glasses. However, the use of the polarization glasses is inconvenient. Therefore, the field provides a 3D technology to separate left-eye images and right-eye images by using a parallax barrier such that the use of the polarization glasses is no longer necessary.

FIG. 1 shows a conventional parallax barrier 9 for 3D display. The parallax barrier 9 includes an upper substrate 91 and a lower substrate 92 disposed oppositely, and a liquid crystal layer 93 sandwiched between the upper substrate 91 and the lower substrate 92. The upper substrate 91 includes an upper glass substrate 911 and an upper transparent electrode 912 formed on the whole surface of the upper glass substrate 911. The lower substrate 92 includes a lower glass substrate 921 and a plurality of lower transparent electrodes 922 arranged in parallel on the lower glass substrate 921. When a potential difference is provided between the upper transparent electrode 912 and the plurality of lower transparent electrodes 922, liquid crystal molecules in alignment between the upper transparent electrode 912 and the plurality of lower transparent electrodes 922 will be rotated to stop the light from penetrating whereas liquid crystal molecules not disposed between the upper transparent electrode 912 and the plurality of lower transparent electrodes 922 do not rotate. In other words, liquid crystal molecules disposed between the upper transparent electrode 912 and gaps between the plurality of lower transparent electrodes 922 do not rotate (i.e. normally white state). In this manner, when a user watches toward the parallax barrier from the upper side of the upper substrate 91 (the light is assumed incident from the lower side of the lower substrate 92 herein), the user is able to see transparent areas and opaque areas arranged alternatively.

When the pixels of a display are designed to have left-eye pixels and right-eye pixels and the parallax barrier 9 is disposed in front of the display, two eyes of a user can watch different image signals through the transparent areas of the parallax barrier 9 such that the user can see 3D images. However, the 3D display adopting the parallax barrier 9 can show 3D images in one direction and thus is not suitable for portable electronic devices capable of displaying in two directions.

Accordingly, it is necessary to provide a 3D display capable of displaying 3D images in two directions (i.e. portrait and landscape modes).

SUMMARY

It is an object of the present invention to provide a 3D display capable of displaying 3D images in two directions, a barrier device and a driving method therefor.

To achieve the above object, the present invention provides a barrier device for 3D display including an upper substrate, a lower substrate and a liquid crystal layer sandwiched between the upper substrate and the lower substrate. The upper substrate includes a first substrate and a first electrode, a first insulation layer and a plurality of first stripe electrodes sequentially formed on the first substrate, wherein the first electrode is made of a whole piece of electrode; the first stripe electrodes are arranged in parallel along a first direction; the first insulation layer is used for electrically insulating the first electrode and the first stripe electrodes. The lower substrate faces the upper substrate, and includes a second substrate and a second electrode, a second insulation layer and a plurality of second stripe electrodes sequentially formed on the second substrate, wherein the second electrode is made of a whole piece of electrode; the second stripe electrodes are arranged in parallel along a second direction; the second insulation layer is used for electrically insulating the second electrode and the second stripe electrodes. The second direction is perpendicular to the first direction.

In one embodiment, the barrier device further includes a controller and a direction sensor. The controller provides a first voltage and a second voltage. The direction sensor determines an operation direction, wherein the controller provides the first voltage to the first stripe electrodes or the second stripe electrodes according to the operation direction.

In another embodiment, when the first voltage is provided to the first stripe electrodes, the controller simultaneously provides the second voltage to the first electrode, the second electrode and the second stripe electrodes. When the first voltage is provided to the second stripe electrodes, the controller simultaneously provides the second voltage to the first electrode, the second electrode and the first stripe electrodes.

The present invention further provides a driving method for a barrier device for 3D display. The barrier device includes an upper substrate, a lower substrate and a direction sensor. The upper substrate includes a first electrode, a first insulation layer and a plurality of first stripe electrodes arranged in parallel along a first direction. The lower substrate includes a second electrode, a second insulation layer and a plurality of second stripe electrodes arranged in parallel along a second direction. The driving method includes the steps of: determining an operation direction with the direction sensor; and forming a potentially difference between the upper substrate and the second stripe electrodes or between the lower substrate and the first stripe electrodes according to the operation direction.

The present invention further provides a 3D display including a direction sensor, a controller, a display panel and a barrier device. The direction sensor is configured to sense an operation direction. The controller is coupled to the direction sensor and outputs a synchronizing signal and two voltage signals according to the operation direction. The display panel is coupled to the controller and displays images according to the synchronizing signal. The barrier device is coupled to the controller and disposed opposite to the display panel. The barrier device includes an upper substrate, a lower substrate and a liquid crystal layer. The upper substrate includes a first substrate and a first electrode, a first insulation layer and a plurality of first stripe electrodes sequentially formed on the first substrate, wherein the first stripe electrodes are arranged in parallel along a first direction The lower substrate includes a second substrate and a second electrode, a second insulation layer and a plurality of second stripe electrodes sequentially formed on the second substrate, wherein the second stripe electrodes are arranged in parallel along a second direction. The liquid crystal layer is sandwiched between the upper substrate and the lower substrate. The second direction is perpendicular to the first direction.

In the 3D display, barrier device and driving method therefor, one of the first voltage and the second voltage is a time-varying voltage and the other is a constant voltage. Preferably, the time-varying voltage changes alternatively between a positive voltage and a negative voltage, and the constant voltage is a ground voltage.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
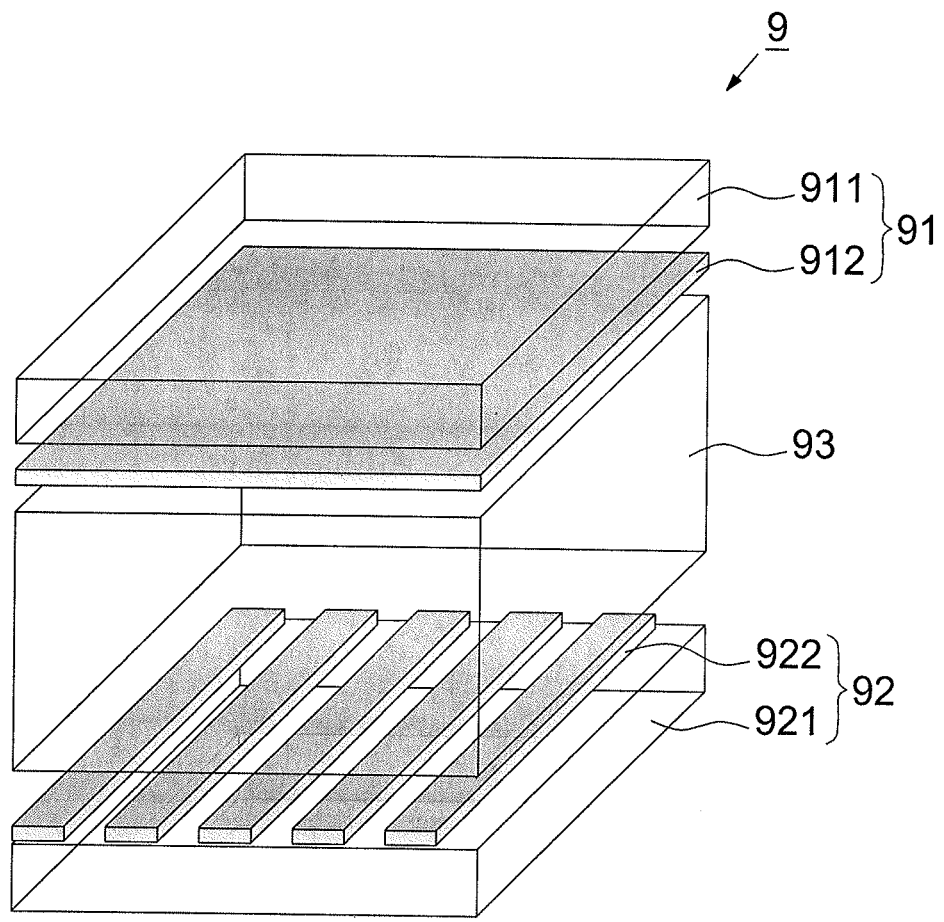
FIG. 1 shows a solid diagram of a conventional parallax barrier.

It should be noted that, wherever possible, the same reference numbers will be used throughout the drawings to refer to the same or like parts.

In the drawings of the present invention, only a part of the components are shown and other components that are not directly related to the present invention are omitted.

Figure 2:
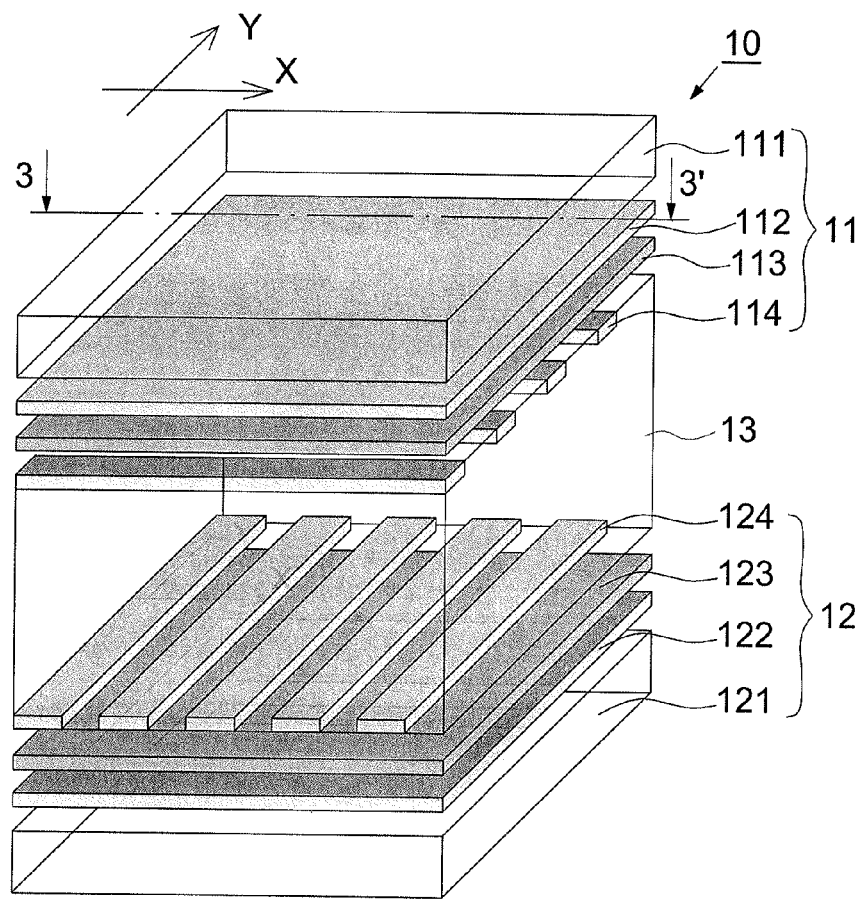
FIG. 2 shows a solid diagram of the barrier device according to an embodiment of the present invention.

Please refer to FIG. 2, it shows a solid diagram of the barrier device according to an embodiment of the present invention. The barrier device 10 is used for three-dimensional (3D) display and is generally arranged between a display panel and an observer or between a display panel and a backlight module such that the observer is able to see different pixel areas on the display panel through the barrier device 10. It should be mentioned that the pixel arrangement of a display panel cooperating with a parallax barrier is well known to the art and details thereof will not be repeated herein.

The barrier device 10 includes an upper substrate 11 and a lower substrate 12 disposed oppositely, and a liquid crystal layer 13 sandwiched between the upper substrate 11 and the lower substrate 12. The upper substrate 11 includes a first substrate 111, and a first electrode 112, a first insulation layer 113 and a plurality of first stripe electrodes 114 are sequentially formed on the first substrate 111 toward the lower substrate 12, and the plurality of the first stripe electrodes 114 are arranged in parallel with each other on the first insulation layer 113. It should be appreciated that in order to allow the visible light to penetrate the upper substrate 11, the first substrate 111, the first electrode 112, the first insulation layer 113 and the first stripe electrodes 114 are preferably transparent to the visible light. The first substrate 111 may be a glass substrate or a flexible substrate, but not limited thereto. The first electrode 112 is preferably made of a whole piece of transparent electrode, e.g. made of indium tin oxide (ITO), but not limited thereto. The first stripe electrodes 114 are electrically coupled to each other and may be formed of, for example ITO, but not limited thereto. Each the first stripe electrode 114 preferably has a rectangular shape and a predetermined space is inserted between every two first stripe electrodes 114, and the first stripe electrodes 114 are arranged in parallel along a first direction (e.g. the Y direction shown in FIG. 2), i.e. the first stripe electrodes 114 have a length direction extending along a second direction (e.g. the X direction shown in FIG. 2). The first insulation layer 113 is configured to electrically insulate the first electrode 112 and the first stripe electrodes 114. It is appreciated that a number of the first stripe electrodes 114 and the predetermined space between every two first stripe electrodes 114 shown in FIG. 2 are only examples rather than limitations to the present invention. In this embodiment, the first direction is perpendicular to the second direction.

The lower substrate 12 includes a second substrate 121, and a second electrode 122, a second insulation layer 123 and a plurality of second stripe electrodes 124 are sequentially formed on second substrate 121 toward the upper substrate 11, and the plurality of the second stripe electrodes 124 are arranged in parallel with each other on the second insulation layer 123. It is appreciated that all components of the lower substrate 12 are also preferably transparent to the visible light. The second electrode 122 is preferably made of a whole piece of transparent electrode, and it may also be a glass substrate or a flexible substrate, but not limited thereto. Each the second stripe electrode 124 preferably has a rectangular shape and a predetermined space is inserted between every two second stripe electrodes 124, and the second stripe electrodes 124 are arranged in parallel along the second direction, i.e. the second stripe electrodes 124 have a length direction extending along the first direction. The second insulation layer 123 is configured to electrically insulate the second electrode 122 and the second stripe electrodes 124. It is appreciated that a number of the second stripe electrodes 124 and the predetermined space between every two second stripe electrodes 124 shown in FIG. 2 are only examples rather than limitations to the present invention.

Figure 3:
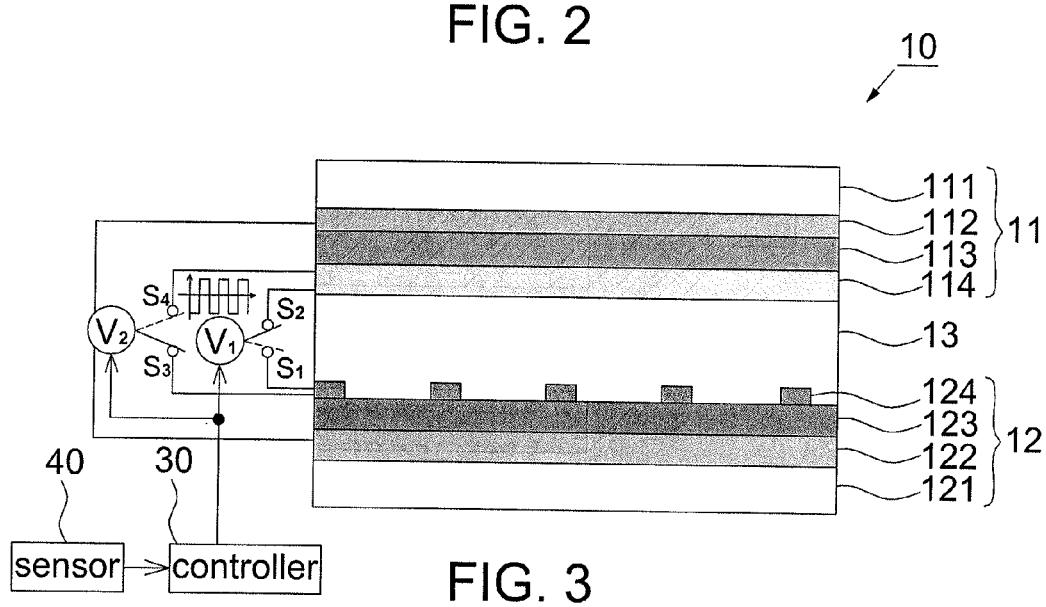
FIG. 3 shows a cross-sectional view taken along the line 3-3' of the barrier device shown in FIG. 2.

Please refer to FIG. 3, it shows a cross-sectional view taken along the line 3-3' of the barrier device shown in FIG. 2. The barrier device 10 forms a potential difference between the upper substrate 11 and the lower substrate 12 so as to alternatively form a plurality of transparent areas and opaque areas by the liquid crystal layer 13 sandwiched between the upper substrate 11 and the lower substrate 12 as shown in FIGS. 4A and 4B, wherein numbers of the transparent areas and opaque areas shown in FIGS. 4A and 4B are only exemplary and are not identical to those of the first and second strip electrodes shown in FIG. 2.

Figure 4A:
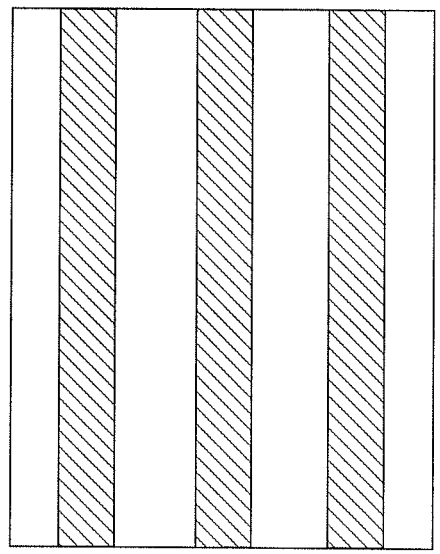
FIG. 4A shows a schematic diagram of a driven state of the barrier device according to the embodiment of the present invention.

Please refer to FIGS. 3 and 4A together, the barrier device 10 is further coupled to a controller 30 and a direction sensor 40. The controller 30 provides a first voltage $V_1$ and a second voltage $V_2$, and the direction sensor 40 is configured to determine an operation direction. When the direction sensor 40 senses that the Y direction shown in FIG. 2 is a desired operation direction (e.g. the display panel is operated in portrait mode as shown in FIG. 4A and two eyes of an observer are opposite to the display panel), the controller 30 provides a first voltage $V_1$ to the second stripe electrodes 124 (i.e. $V_1$ is coupled to the connection point $S_1$), wherein the first voltage $V_1$ may be a time-varying voltage shown in FIG. 3 changing alternatively between a positive voltage and a negative voltage. The controller 30 simultaneously provides a second voltage $V_2$ to the first electrode 112, the second electrode 122 and the first stripe electrodes 114 (i.e. $V_2$ is coupled to the connection point $S_4$), wherein the second voltage $V_2$ is served as a reference voltage and has a constant voltage, e.g. a ground voltage. Accordingly, a time-varying potential difference may be formed between the second stripe electrodes 124 and the upper substrate 11 so as to drive liquid crystal molecules in alignment with the second stripe electrodes 124 in the liquid crystal layer 13. For example, if the liquid crystal layer 13 is normally white, the liquid crystal molecules in alignment between the second stripe electrodes 124 and the upper substrate 11 are driven to a dark state by the potential difference, i.e. opaque areas (areas filled with slanted lines); and the liquid crystal molecules not in alignment between the second stripe electrodes 124 and the upper substrate 11 will not be driven by the potential difference and are maintained a bright state, i.e. transparent areas (blank areas). In this manner, a plurality of transparent areas and opaque areas may be formed alternatively in the liquid crystal layer 13 as shown in FIG. 4A. It is appreciated that if the liquid crystal layer 13 is normally black, the transparent areas and the opaque areas formed in the liquid crystal layer 13 are opposite to those shown in FIG. 4A. In other embodiments, it is able to select the first voltage $V_1$ as a constant voltage and the second voltage $V_2$ as a time-varying voltage.

Figure 4B:
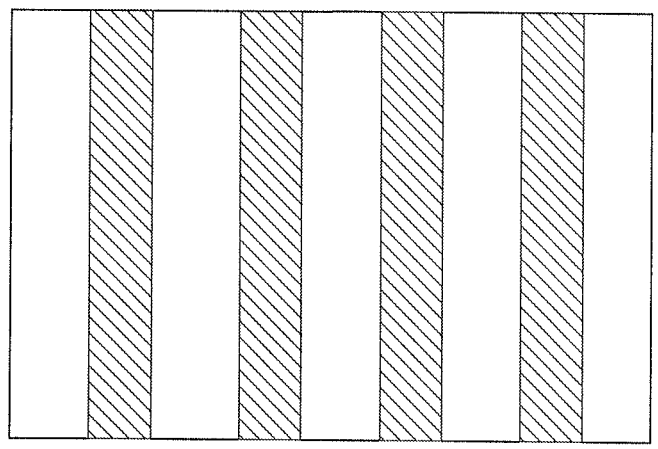
FIG. 4B shows a schematic diagram of another driven state of the barrier device according to the embodiment of the present invention.

Please refer to FIGS. 3 and 4B together, when the direction sensor 40 senses that the X direction shown in FIG. 2 is a desired operation direction (e.g. the display panel is operated in landscapes mode as shown in FIG. 4B and two eyes of an observer are opposite to the display panel), the controller 30 provides a first voltage $V_1$ to the first stripe electrodes 114 (i.e. $V_1$ is coupled to the connection point $S_2$). The controller 30 simultaneously provides a second voltage $V_2$ to the first electrode 112, the second electrode 122 and the second stripe electrodes 124 (i.e. $V_2$ is coupled to the connection point $S_3$). Accordingly, a time-varying potential difference may be formed between the first stripe electrodes 114 and the lower substrate 12 so as to drive liquid crystal molecules in alignment with the first stripe electrodes 114 in the liquid crystal layer 13. If the liquid crystal layer 13 is normally white, the liquid crystal molecules in alignment between the first stripe electrodes 114 and the lower substrate 12 are driven to a dark state by the potential difference, i.e. opaque areas; and the liquid crystal molecules not in alignment between the first stripe electrodes 114 and the lower substrate 12 will not be driven by the potential difference and are maintained a bright state, i.e. transparent areas. In this manner, a plurality of transparent areas and opaque areas may be formed alternatively in the liquid crystal layer 13 as shown in FIG. 4B. If the liquid crystal layer 13 is normally black, the transparent areas and the opaque areas formed in the liquid crystal layer 13 are opposite to those shown in FIG. 4B.

As mentioned above, the barrier device 10 of the present invention may drive different electrodes to change the distribution of transparent areas and opaque areas corresponding to different operation directions.

Figure 5:
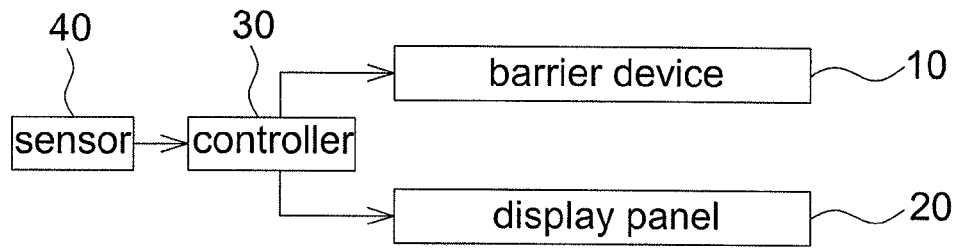
FIG. 5 shows a block diagram of the 3D display according to an embodiment of the present invention.

Please refer to FIG. 5, it shows a block diagram of the 3D display according to an embodiment of the present invention, which includes a barrier device 10, a display panel 20, a controller 30 and a direction sensor 40. The direction sensor 40 may be a G sensor or an arbitrary sensor configured to sense an operation direction of a 3D display. The controller 30 generates a vertical synchronizing signal (V_sync) or a horizontal synchronizing signal (H_sync) according to the operation direction to control a display direction of the display panel 20, and outputs the first voltage $V_1$ and the second voltage $V_2$ to the barrier device 10. The controller 30 may be, for example, includes a barrier driver configured to drive the barrier device 10 and a panel driver configured to drive the display panel 20. In other embodiments, the barrier driver and the panel driver may be separated from the controller 30. The barrier device 10 may be the one shown in FIG. 2, and the controller 30 may provide a potential difference to different electrodes of the barrier device 10 according to different operation directions so as to form the transparent areas and opaque areas shown in FIGS. 4A and 4B. The display panel 20 may be any conventional display panel for displaying 3D images. More specifically, the display panel 20 may separate 3D image signals inputted to left-eye image signals and right-eye image signals, and displays in portrait or landscape mode according to the synchronizing signal received. The display panel 20 may be a liquid crystal display panel or a plasma display panel, but not limited thereto.

Figure 6:
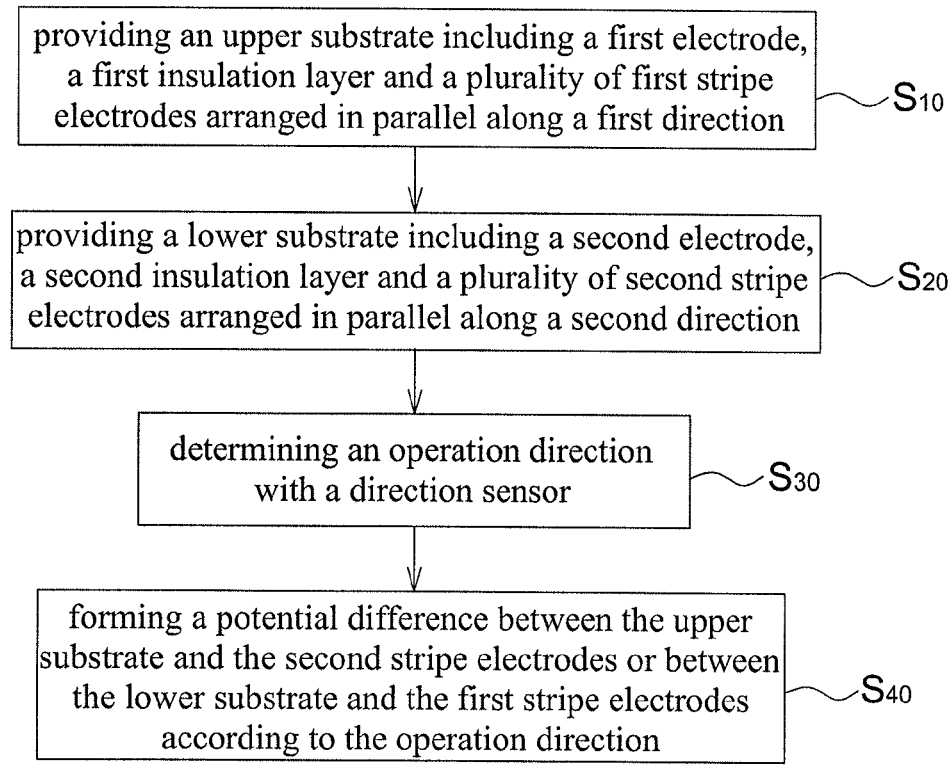
FIG. 6 shows a flow chart of the driving method for the barrier device according to an embodiment of the present invention.

Please refer to FIG. 6, it shows a flow chart of the driving method for the barrier device 10 according to an embodiment of the present invention, which includes the steps of: providing an upper substrate including a first electrode, a first insulation layer and a plurality of first stripe electrodes arranged in parallel along a first direction (Step $S_{10}$); providing a lower substrate including a second electrode, a second insulation layer and a plurality of second stripe electrodes arranged in parallel along a second direction (Step $S_{20}$); determining an operation direction with a direction sensor (Step $S_{30}$); and forming a potential difference between the upper substrate and the second stripe electrodes or between the lower substrate and the first stripe electrodes according to the operation direction (Step $S_{40}$). Details of the driving method for the barrier device according to the present invention have been described in FIGS. 2 to 4B and corresponding descriptions thereof and thus will not be repeated herein.

As mentioned above, as conventional parallax barriers can only be operated in a single direction, they are not suitable for portable electronic devices capable of displaying in two directions. The present invention further provides a 3D display capable of operating in portrait and landscape modes, and the driving direction may be easily changed by driving different electrodes of the barrier device thereby increasing the practicability of the barrier device.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A barrier device for a 3D display, comprising:
an upper substrate comprising a first substrate and a first electrode, a first insulation layer and a plurality of first stripe electrodes sequentially formed on the first substrate, wherein
the first electrode is made of a whole piece of electrode;
the first stripe electrodes are arranged in parallel along a first direction; and
the first insulation layer is used for electrically insulating the first electrode and the first stripe electrodes;
a lower substrate facing the upper substrate, and comprising a second substrate and a second electrode, a second insulation layer and a plurality of second stripe electrodes sequentially formed on the second substrate, wherein
the second electrode is made of a whole piece of electrode;
the second stripe electrodes are arranged in parallel along a second direction perpendicular to the first direction; and
the second insulation layer is used for electrically insulating the second electrode and the second stripe electrodes;
a liquid crystal layer sandwiched between the upper substrate and the lower substrate; and
a controller for providing a first voltage and a second voltage, wherein
when the first voltage is provided to the first stripe electrodes, the controller simultaneously provides the second voltage to the first electrode, the second electrode and the second stripe electrodes; and
when the first voltage is provided to the second stripe electrodes, the controller simultaneously provides the second voltage to the first electrode, the second electrode and the first stripe electrodes.

2. The barrier device as claimed in claim 1, further comprising a direction sensor for determining an operation direction, wherein the controller provides the first voltage to the first stripe electrodes or the second stripe electrodes according to the operation direction.

3. The barrier device as claimed in claim 1, wherein the first voltage is a time-varying voltage and the second voltage is a constant voltage.

4. The barrier device as claimed in claim 3, wherein
the time-varying voltage changes alternatively between a positive voltage and a negative voltage; and
the constant voltage is a ground voltage.

5. The barrier device as claimed in claim 1, wherein
the first stripe electrodes have a length direction extending along the second direction; and
the second stripe electrodes have a length direction extending along the first direction.

6. The barrier device as claimed in claim 1, wherein
the first electrode, the first insulation layer and the first stripe electrodes are sequentially formed, toward the lower substrate, on the first substrate; and
the second electrode, the second insulation layer and the second stripe electrodes are sequentially formed, toward the upper substrate, on the second substrate.

7. A driving method for a barrier device for a 3D display, the barrier device comprising an upper substrate, a lower substrate and a direction sensor, the upper substrate comprising a first electrode, a first insulation layer and a plurality of first stripe electrodes arranged in parallel along a first direction, the lower substrate comprising a second electrode, a second insulation layer and a plurality of second stripe electrodes arranged in parallel along a second direction, the driving method comprising the steps of:
determining an operation direction with the direction sensor; and
forming a potential difference between the upper substrate and the second stripe electrodes or between the lower substrate and the first stripe electrodes according to the operation direction,
wherein the step of forming a potential difference between the upper substrate and teh second stripe electrodes comprises
providing a first voltage to the second stripe electrodes, and
providing a second voltage to the first electrode, the second electrode and the first stripe electrodes; and
wherein the step of forming a potential difference between the lower substrate and the first stripe electrodes comprises
providing a first voltage to the first stripe electrodes, and
providing a second voltage to the first electrode, the second electrode and the second stripe electrodes.

8. The driving method as claimed in claim 7, wherein the first voltage is a time-varying voltage changing alternatively between a positive voltage and a negative voltage, and the second voltage is a ground voltage.

9. A 3D display, comprising:
a direction sensor configured to sense an operation direction;
a controller coupled to the direction sensor and outputting a synchronizing signal and two voltage signals according to the operation direction;
a display panel coupled to the controller and displaying images according to the synchronizing signal; and
a barrier device coupled to the controller and disposed opposite to the display panel, the barrier device comprising an upper substrate, a lower substrate and a liquid crystal layer, wherein
the upper substrate comprises a first substrate and a first electrode, a first insulation layer and a plurality of first stripe electrodes sequentially formed on the first substrate, wherein the first stripe electrodes are arranged in parallel along a first direction;
the lower substrate comprises a second substrate and a second electrode, a second insulation layer and a plurality of second stripe electrodes sequentially formed on the second substrate, wherein the second stripe electrodes are arranged in parallel along a second direction perpendicular to the first direction;
the liquid crystal layer is sandwiched between the upper substrate and the lower substrate.

10. The 3D display as claimed in claim 9, wherein
the two voltage signals include a first voltage and a second voltage, and the controller provides the first voltage to the first stripe electrodes and provides the second voltage to the first electrode, the second electrode and the second stripe electrodes when the synchronizing signal is a horizontal synchronizing signal; and
the controller provides the first voltage to the second stripe electrodes and provides the second voltage to the first electrode, the second electrode and the first stripe electrodes ƒwhen the synchronizing signal is a vertical synchronizing signal.

11. The 3D display as claimed in claim 10, wherein the first voltage is a time-varying voltage and the second voltage is a constant voltage.

12. The 3D display as claimed in claim 11, wherein
the time-varying voltage changes alternatively between a positive voltage and a negative voltage; and
the constant voltage is a ground voltage.

* * * * *